Patented Aug. 20, 1929.

1,725,156

UNITED STATES PATENT OFFICE.

KURT MEISENBURG, OF LEVERKUSEN-ON-THE-RHINE, GERMANY, ASSIGNOR TO WINTHROP CHEMICAL COMPANY, INC., OF NEW YORK, N. Y., A CORPORATION OF NEW YORK.

PROCESS FOR THE MANUFACTURE OF CROTYL BROMIDE.

No Drawing. Application filed April 5, 1928, Serial No. 267,804, and in Germany April 30, 1927.

The present invention concerns a process for the manufacture of crotyl bromide by treating butadiene 1:3 with hydrogen bromide, advantageously in a solvent, being capable of dissolving the latter.

Until now it has been necessary in the manufacture of crotyl bromide $CH_3-CH=CH\ CH_2Br$ to start from crotyl alcohol, which is only obtainable with difficulty. (Ber. 56, page 541, section 2.)

In accordance with the present invention this compound is obtained with a very satisfactory yield and in an extremely cheap manner by adding hydrogen bromide to butadiene 1:3 (erythrene, divinyl), which is now easily obtainable commercially. The smooth formation of the crotyl bromide in this new manner is surprising, since in the case of hydrocarbons with conjugated double linkages the position at which the addition of hydrogen bromide occurs is always a matter of conjecture. (Houben-Weyl, Methoden der organischen Chemie, 2nd, edition, volume 2, page 770.) For example, hydrogen bromide adds itself to α-phenylbu-tadiene in the 3:4-position with the formation of α-phenyl-γ-bromobutylene of the formula

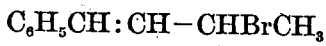

$C_6H_5CH:CH-CHBrCH_3$ (C. N. Rüber, Berichte der deutschen chemischen Gesellschaft, volume 44, page 2974.). Accordingly the course of the addition of hydrogen bromide to butadiene $CH_2=CH-CH=CH_2$ could in no way be predicted. As a matter of fact the crotyl bromide is formed almost exclusively besides small quantities of dibromobutane. The reaction is advantageously carried out by introducing butadiene in the liquid or gaseous state into a solution of hydrogen bromide in a solvent, such as for example, glacial acetic acid. The resulting solution of crotyl bromide is diluted with water and the halogenide, which separates is washed, dried and distilled.

The following example illustrates my invention without limiting it thereto:

*Example.*—37 parts by weight of butadiene 1:3 are led with stirring into a solution of 57 parts by weight of hydrogen bromide in 100 parts by weight of glacial acetic acid, the gas being absorbed with evolution of heat. The reaction mass is poured on to ice water, the heavy oil which is found to have collected at the bottom is separated, dried over calcium chloride and distilled. The pure crotyl bromide thus obtained boils at 98–103° C. The yield was found to be 80–85% of the theoretical.

I claim:

1. In the process for the manufacture of crotyl-bromide, the step which comprises reacting with hydrogen bromide upon butadiene 1:3.

2. In the process for the manufacture of crotyl-bromide, the step which comprises reacting with hydrogen bromide upon butadiene 1:3 in the presence of a solvent being capable of dissolving hydrogen bromide.

3. In the process for the manufacture of crotyl-bromide, the step which comprises reacting with hydrogen bromide upon butadiene 1:3 in the presence of glacial acetic acid.

4. Process, which consists in reacting upon butadiene 1:3 with hydrogen bromide, dissolved in glacial acetic acid, pouring the reaction mass on to ice, drying the heavy oil which separates and distilling it.

In testimony whereof I have hereunto set my hand.

KURT MEISENBURG.